US008944367B2

(12) United States Patent
Bystry, Jr. et al.

(10) Patent No.: US 8,944,367 B2
(45) Date of Patent: Feb. 3, 2015

(54) ROTARY WING AIRCRAFT PROPULSION SYSTEM

(75) Inventors: Mark Denton Bystry, Jr., Stratford, CT (US); Joseph Simonetti, Southbury, CT (US); Matthew J. Tarascio, Milford, CT (US); Michael Peter Strauss, New Haven, CT (US); Adam Kasprzyk, Shelton, CT (US); Timothy Fred Lauder, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 513 days.

(21) Appl. No.: 13/411,782

(22) Filed: Mar. 5, 2012

(65) Prior Publication Data

US 2013/0228647 A1 Sep. 5, 2013

(51) Int. Cl.
*B64C 27/82* (2006.01)

(52) U.S. Cl.
USPC .......................................... 244/17.21; 244/58

(58) Field of Classification Search
CPC ........................ B64C 2027/8209; B64C 27/82
USPC .............. 244/17.21, 58, 60; 136/205; 60/784, 60/785
See application file for complete search history.

(56) References Cited

U.S. PATENT DOCUMENTS

| 4,702,437 | A | 10/1987 | Stearns, Jr. |
| 5,484,122 | A | 1/1996 | DeSalve |
| 7,258,086 | B2 | 8/2007 | Fitzgerald |
| 7,629,530 | B2* | 12/2009 | Inaoka .......................... 136/205 |
| 7,775,031 | B2 | 8/2010 | Wood |
| 8,464,980 | B2* | 6/2013 | Certain .......................... 244/58 |
| 8,484,983 | B2* | 7/2013 | Gao et al. ...................... 60/785 |
| 2009/0159110 | A1 | 6/2009 | Kwok et al. |
| 2009/0288816 | A1 | 11/2009 | Reeve |
| 2010/0077741 | A1 | 4/2010 | Samuel |
| 2010/0123039 | A1 | 5/2010 | Buhl et al. |
| 2010/0126178 | A1* | 5/2010 | Hyde et al. ..................... 60/767 |
| 2011/0024555 | A1 | 2/2011 | Kuhn, Jr. |
| 2011/0131999 | A1 | 6/2011 | Gao et al. |
| 2013/0264412 | A1* | 10/2013 | Dyrla ......................... 244/17.13 |
| 2014/0203739 | A1* | 7/2014 | Chantriaux et al. .......... 318/139 |

OTHER PUBLICATIONS

Notification of Transmittal of the European Search Report of the European Searching Authority, or the Declaration; Application No. 13157655.5-1754; Jul. 5, 2013.

* cited by examiner

*Primary Examiner* — Brian M O'Hara
(74) *Attorney, Agent, or Firm* — Cantor Colburn LLP

(57) ABSTRACT

A rotary wing aircraft propulsion system includes an engine, a heat exchanger cooling a fluid from the engine and a thermoelectric generator in thermal communication with the fluid to generate electrical power. The thermoelectric generator provides electrical power to at least one aircraft component.

18 Claims, 5 Drawing Sheets

ROTARY WING AIRCRAFT PROPULSION SYSTEM

BACKGROUND

The subject matter disclosed herein relates generally to propulsion systems, and in particular to a propulsion system for a rotary wing aircraft having improved efficiency.

Existing rotary wing aircraft (e.g., intermediate to medium-weight class rotorcraft) utilize propulsion systems to power aircraft flight, that may include spark ignition (SI) or compression ignition (CI) engines. Energy (stored in chemical form as fuel) is supplied to an energy conversion device (a gas turbine engine) and is transmitted through a transmission mechanism (the main rotor gearbox), from which mechanical work (in the form of shaft power supplied to drive the main rotor and tail rotor) and heat emerge. One exemplary aircraft is an S-76 helicopter. During steady, level flight the conventional propulsion system of the S-76 converts only a small portion of the chemical energy stored in the Jet-A fuel (⅓) to mechanical energy. The remainder of the energy is lost to the surrounding environment in the form of heat (⅔), primarily through high-temperature exhaust and cooling air. System accessories (such as the aircraft's electrical load requirements) and mechanical transmission losses contribute an additional 1-2% energy loss in the system, resulting in even lower useful shaft power to the main and tail rotors. A propulsion system for a rotary wing aircraft having higher efficiency would be well received in the art.

SUMMARY

One embodiment includes a rotary wing aircraft propulsion system comprising: an engine; a heat exchanger cooling a fluid from the engine; and a thermoelectric generator in thermal communication with the fluid to generate electrical power; the thermoelectric generator providing electrical power to at least one aircraft component.

Another embodiment includes a rotary wing aircraft comprising: an airframe; an engine; a main gearbox transferring force from the engine to a rotor hub; a heat exchanger cooling a fluid from the engine; and a thermoelectric generator in thermal communication with the fluid to generate electrical power; the thermoelectric generator providing electrical power to at least one aircraft component.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
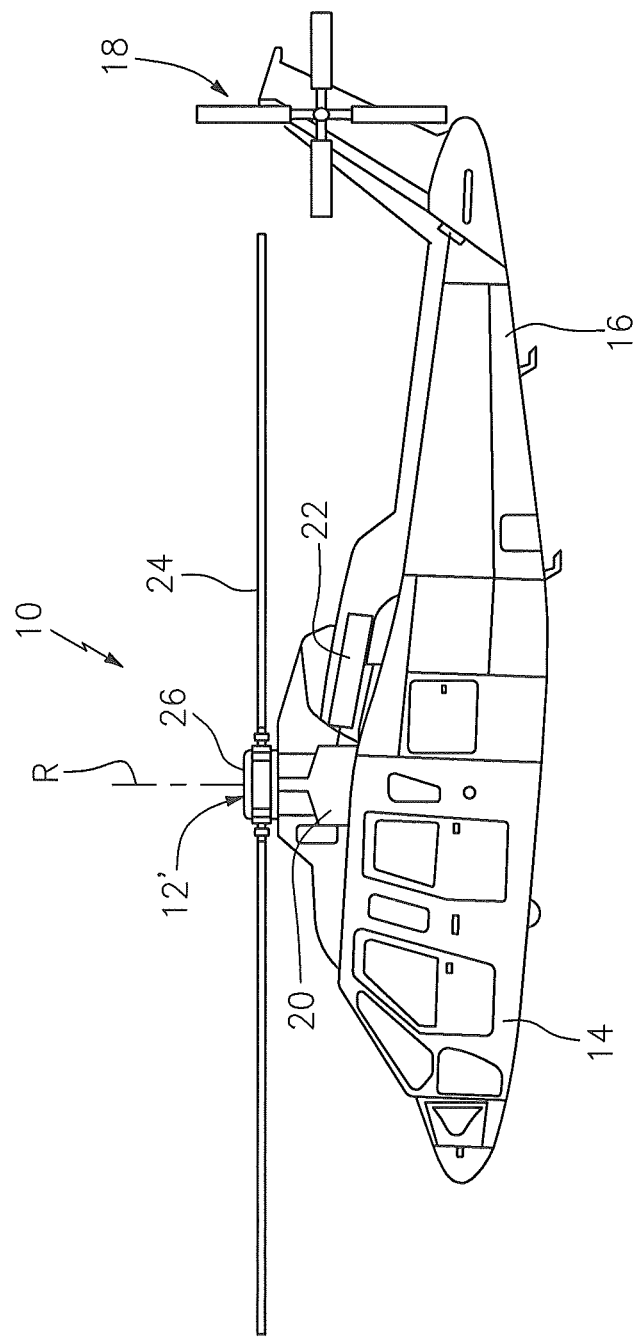
FIG. 1 illustrates an exemplary rotary wing aircraft.

FIG. 1 schematically illustrates a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
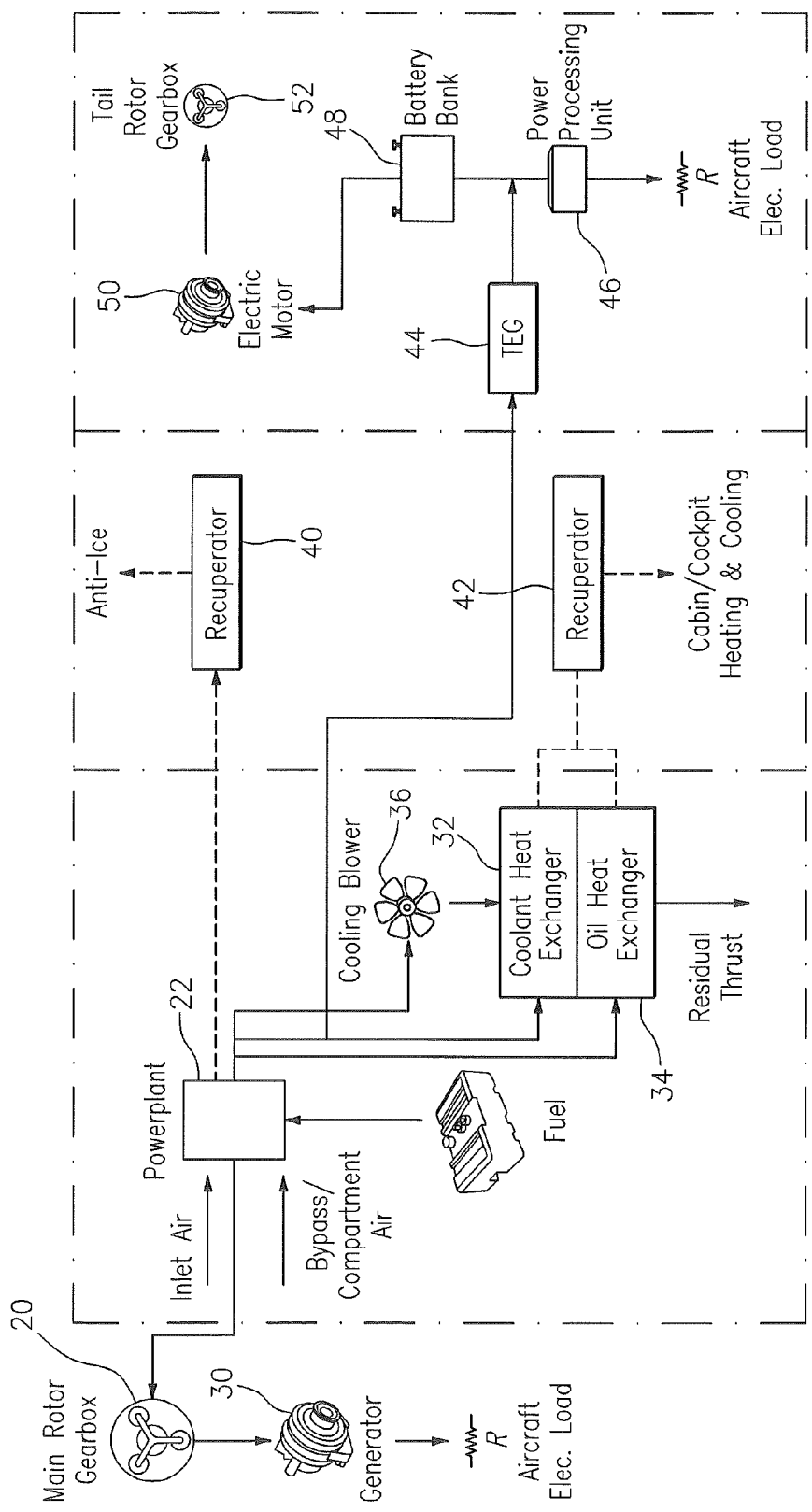
FIG. 2 depicts a rotary wing aircraft propulsion system in an exemplary embodiment.

FIG. 2 depicts a rotary wing aircraft propulsion system in an exemplary embodiment. The propulsion system includes engine 22 that is used to drive main rotor gear box 20. A gearbox mounted generator 30 may be mounted to gearbox 20 to provide power for aircraft electrical loads. Engine 22 may be a conventional CI or SI engine installation, that produces large amounts of heat that needs to be dissipated. Because this heat load is so large and required combustion airflow is low when compared to turbine engines, a liquid cooled engine 22 is used. As known in the art, coolant from the engine is provided to a coolant heat exchanger 32 to be cooled and circulated back to engine 22. Also, oil from engine 22 may be provided to an oil heat exchanger 34 to cool the oil and then circulated back to engine 22. Engine 22 drives a cooling blower 36 to drive air over the coolant heat exchanger 32 and the oil heat exchanger 34. Coolant heat exchanger 32 and the oil heat exchanger 34 may be located at different locations.

Excess thermal energy from one or more hot fluids from engine 22 can be used to power other aircraft system components. A recuperator 40 may receive one or both of coolant and/or oil from engine 22 and use thermal energy from these fluids to provide an anti-ice function. In an exemplary embodiment, the recuperator 40 is a heat exchanger that heats an anti-ice fluid (e.g., air, antifreeze) through thermal communication with coolant and/or oil from engine 22. Recuperator 40 may be fluidly coupled in parallel or in series with coolant heat exchanger 32 and oil heat exchanger 34.

A second recuperator 42 may receive one or both of coolant and/or oil from engine 22 and use thermal energy from these fluids to provide aircraft compartment (e.g., cabin or cockpit) heating and cooling. In an exemplary embodiment, the recuperator 42 is a heat exchanger that extracts heat through thermal communication with coolant and/or oil from engine 22. Recuperator 42 may be fluidly coupled in parallel or in series with coolant heat exchanger 32 and oil heat exchanger 34.

A thermal electric generator 44 may receive one or both of coolant and/or oil from engine 22, and through thermal communication with these fluids, provide electrical power to aircraft components. In exemplary embodiments, the thermal electric generator generates DC electrical power, which is converted to AC electrical power at power converter 46. The output of power converter 46 is used to power aircraft electrical loads. DC power from the thermal electric generator 44 may also be used to charge battery 48. Battery 48 powers a motor 50 that drives a tail rotor gearbox 52. Thermal electric generator 44 may be an isolated unit or may be mounted on any heat exchanger in the propulsion system and be in thermal communication with the heat exchanger. In alternate embodiments, the thermal electric generator 44 is integrated within a heat exchanger as a single unit. Thermal electric generator 44 may be fluidly coupled in parallel or in series with coolant heat exchanger 32 and oil heat exchanger 34.

Figure 3:
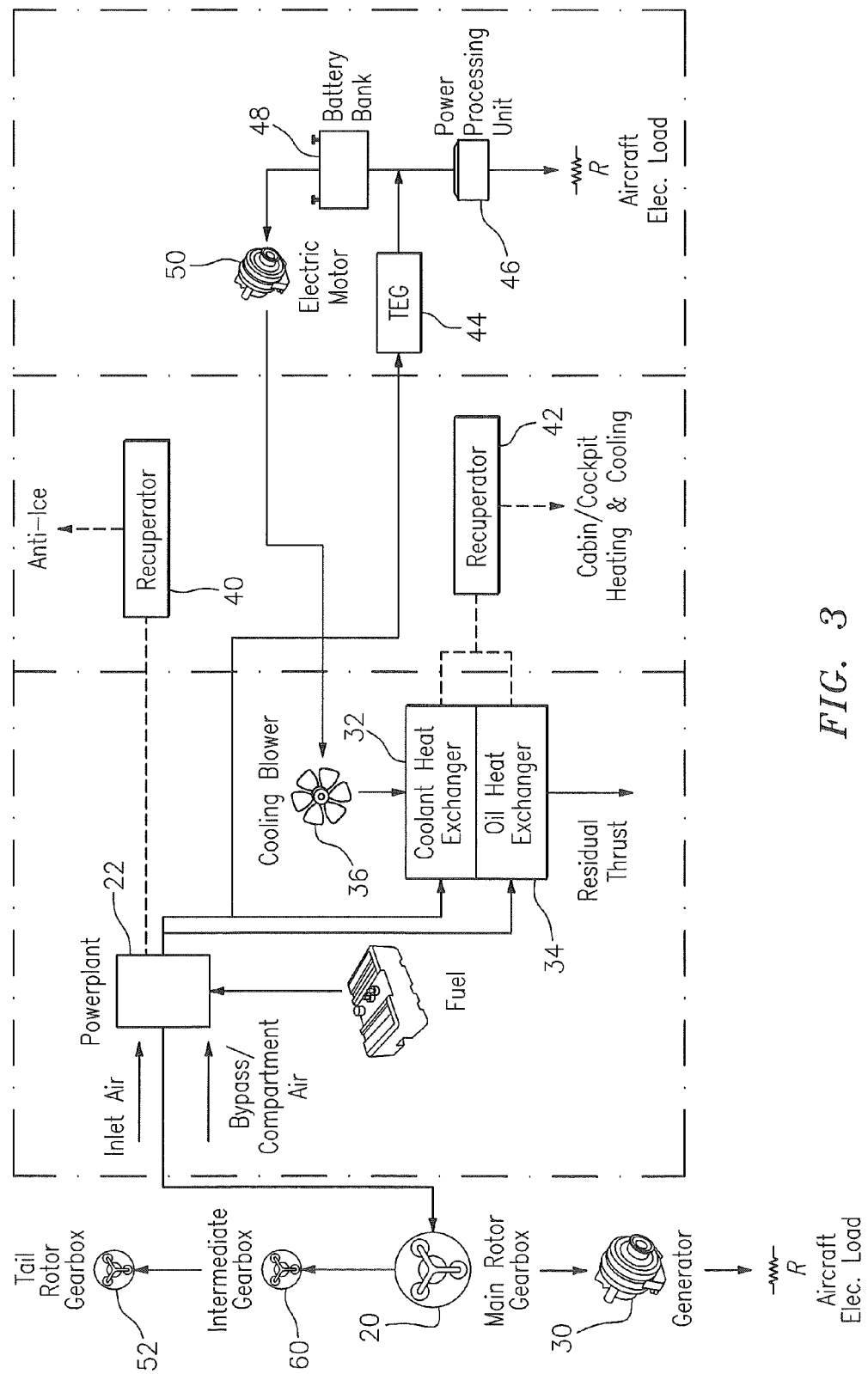
FIG. 3 depicts a rotary wing aircraft propulsion system in an exemplary embodiment.

FIG. 3 depicts a rotary wing aircraft propulsion system in an exemplary embodiment. In FIG. 3, engine 22 drives main rotor gearbox 20, which drives main gearbox generator 30 as noted above. Main rotor gearbox 20 also drives tail rotor gearbox 52 through an intermediate gearbox 60. First recuperator 40 and second recuperator 42 are similar to those elements in FIG. 2, and provide anti-ice and compartment heating/cooling as noted with reference to FIG. 2.

Thermal electric generator 44 may receive one or both of coolant and/or oil from engine 22, and through thermal communication with these fluids, provide electrical power to aircraft components. Thermal electric generator 44 may be an isolated unit and/or may be mounted on any heat exchanger in the propulsion system and be in thermal communication with the heat exchanger. In alternate embodiments, the thermal electric generator 44 is integrated within a heat exchanger as a single unit. In the configuration shown in FIG. 3, the thermal electric generator 44 generates DC electrical power, which is converted to AC electrical power at power converter 46. The output of power converter 46 is used to power aircraft electrical loads. DC power from the thermal electric generator 44 may also be used to charge battery 48. Battery 48 powers a motor that drives cooling blower 36.

Figure 4:
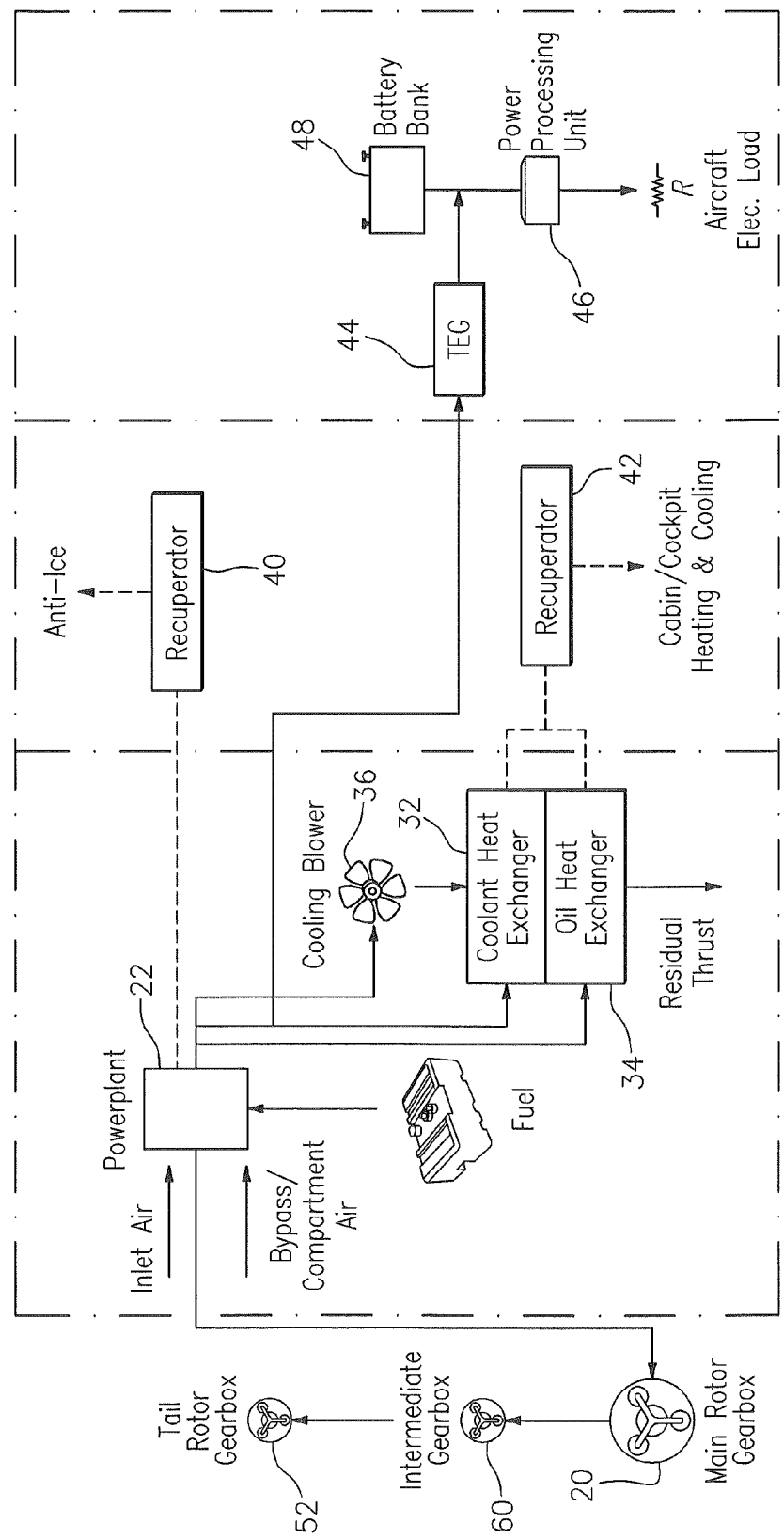
FIG. 4 depicts a rotary wing aircraft propulsion system in an exemplary embodiment.

FIG. 4 depicts a rotary wing aircraft propulsion system in an exemplary embodiment. In FIG. 4, engine 22 drives main rotor gearbox 20, which in turn drives tail rotor gearbox 52 through an intermediate gearbox 60. Engine 22 also drives cooling blower 36. First recuperator 40 and second recuperator 42 are similar to those elements in FIG. 2, and provide anti-ice and compartment heating/cooling as noted with reference to FIG. 2.

Thermal electric generator 44 may receive one or both of coolant and/or oil from engine 22, and through thermal communication with these fluids, provide electrical power to aircraft components. Thermal electric generator 44 may be an isolated unit or may be mounted on any heat exchanger in the propulsion system and be in thermal communication with the heat exchanger. In alternate embodiments, the thermal electric generator 44 is integrated within a heat exchanger as a single unit. In the configuration shown in FIG. 4, the thermal electric generator 44 generates DC electrical power, which is converted to AC electrical power at power converter 46. The output of power converter 46 is used to power aircraft electrical loads. DC power from the thermal electric generator 44 may also be used to charge battery 48. Battery 48 provides backup power for aircraft electrical systems.

Figure 5:
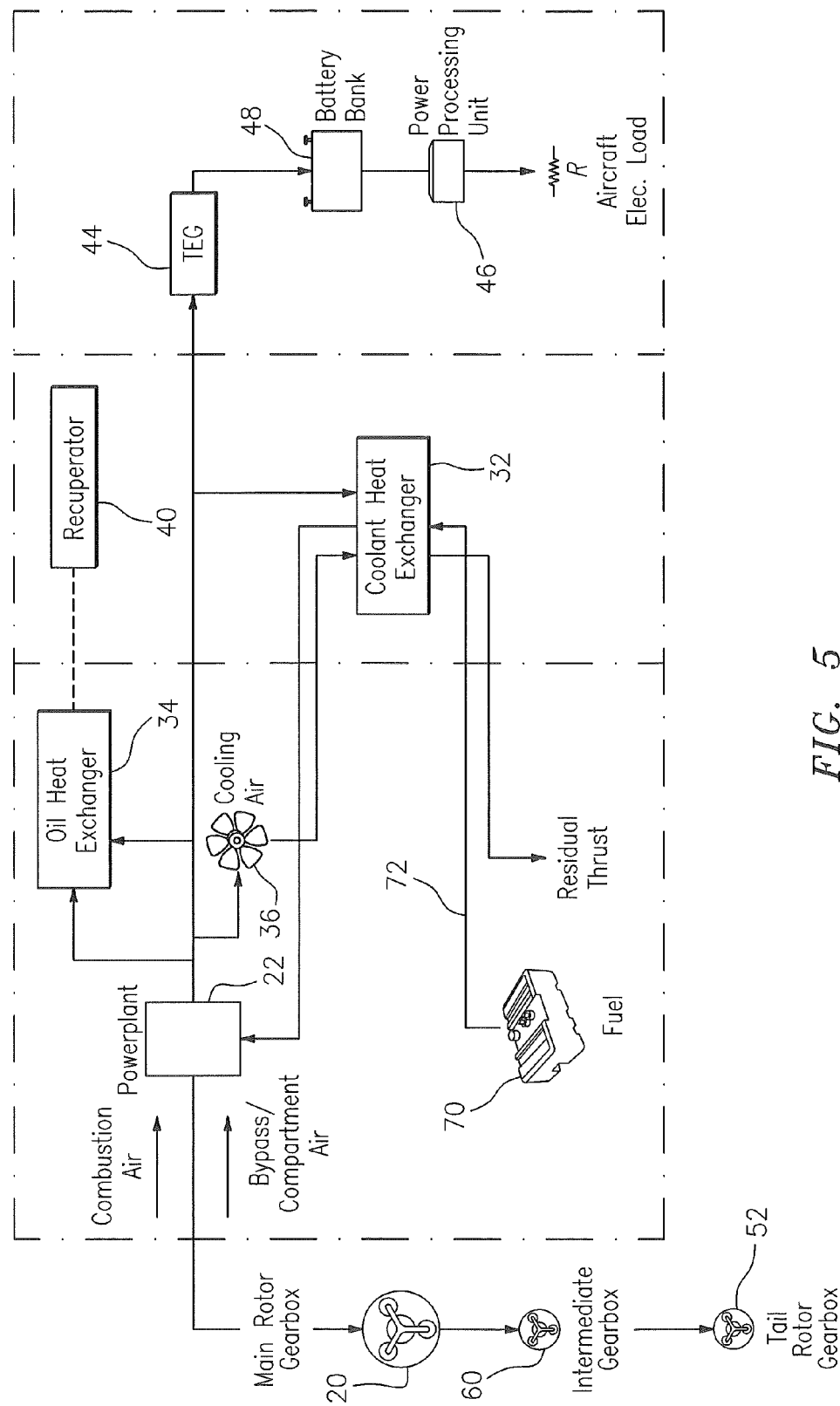
FIG. 5 depicts a rotary wing aircraft propulsion system in an exemplary embodiment.

FIG. 5 depicts a rotary wing aircraft propulsion system in an exemplary embodiment. In FIG. 5, engine 22 drives main rotor gearbox 20, which drives tail rotor gearbox 52 through an intermediate gearbox 60. Engine 22 also drives cooling blower 36. First recuperator 40 is similar to that element in FIG. 2, and provides anti-ice functionality as noted with reference to FIG. 2. Oil heat exchanger 34 is depicted as coupled to recuperator 40, but it is understood that coolant heat exchanger 32 may be used instead of, or in conjunction with, oil heat exchanger 34.

Thermal electric generator 44 may receive one or both of coolant and/or oil from engine 22, and through thermal communication with these fluids, provide electrical power to aircraft components. Thermal electric generator 44 may be an isolated unit or may be mounted on any heat exchanger in the propulsion system and be in thermal communication with the heat exchanger. In alternate embodiments, the thermal electric generator 44 is integrated within a heat exchanger as a single unit. In the configuration shown in FIG. 5, the thermal electric generator 44 generates DC electrical power, which charges a battery 48. Power converter 46 converts DC power from battery 48 to AC electrical power. The output of power converter 46 is used to power aircraft electrical loads.

Also shown in FIG. 5 is a fuel source 70 coupled to engine 22 through coolant heat exchanger 34. Fuel from fuel source 70 is supplied on fuel supply line 72. At least a portion of fuel supply line 72 is thermally coupled to coolant heat exchanger 34 and then routed to engine 22. Warming the fuel from fuel source 70 improves combustion at engine 22. Coolant heat exchanger 32 is depicted as coupled to fuel source 70, but it is understood that oil heat exchanger 34 may be used instead of, or in conjunction with, coolant heat exchanger 32 to transfer heat to the fuel from fuel source 70. In this embodiment, the fuel itself serves as a heat sink for excess engine heat. Using the fuel as a heat sink has potential to reduce the size of the coolant heat exchanger 32 and the required amount of coolant. The residual energy has the potential to augment the heating and cooling systems as well as electrical systems through the use of the thermal electric generator 44.

Embodiments enable advanced SI or CI engines to be installed on a rotary wing aircraft with maximum total energy conversion efficiency. This results in lower fuel consumption, emissions (both toxic and greenhouse gas), operation and life-cycle costs. Through lower fuel consumption, aircraft range or payload capacity can be increased for a given mission. With recuperated energy power devices, the conventional auxiliary power unit (APU) can be eliminated, contributing to even lower fuel consumption and improved empty weight fraction. In this approach a combination of battery power, TEG, and starter/generator provide power to aircraft systems. On the ground, in this mode, the engine will declutch from the transmission to allow rotors to be stopped but still provide electrical energy As shown in FIG. 2, an electrified tail rotor (ETR) can be integrated, which can alleviate the energy and power requirements from the main fuel system, transmission and main engines. The aggregate impact of embodiments can result in a smaller, lighter, more efficient and less costly aircraft The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft propulsion system comprising:
   an engine;
   a heat exchanger cooling a fluid from the engine;
   a thermoelectric generator in thermal communication with the fluid to generate electrical power; and
   a tail rotor motor for driving a tail rotor gearbox;
   wherein the tail rotor motor receives electrical power from the thermoelectric generator; and
   the thermoelectric generator providing electrical power to at least one aircraft component.

2. The rotary wing aircraft propulsion system of claim 1 wherein:

the heat exchanger is at least one of a coolant heat exchanger cooling engine coolant and an oil heat exchanger cooling oil from the engine.

3. The rotary wing aircraft propulsion system of claim 2 further comprising: a fuel source; a fuel supply line providing fuel to the engine;
wherein the fuel supply line is thermally coupled to at least one of the coolant heat exchanger and the oil heat exchanger.

4. The rotary wing aircraft propulsion system of claim 2 wherein:
the thermoelectric generator is mounted to at least one of the coolant heat exchanger and the oil heat exchanger.

5. The rotary wing aircraft propulsion system of claim 1 further comprising:
a recuperator in thermal communication with the fluid, the recuperator using heat from the fluid to provide an anti-ice function.

6. The rotary wing aircraft propulsion system of claim 1 further comprising:
a recuperator in thermal communication with the fluid, the recuperator using heat from the fluid to provide aircraft compartment heating or cooling.

7. The rotary wing aircraft propulsion system of claim 1 further comprising:
a battery coupled to the thermoelectric generator.

8. The rotary wing aircraft propulsion system of claim 7 further comprising:
a power convertor coupled to the battery, the power converter converting DC electrical power from the thermoelectric generator to AC electrical power for aircraft loads.

9. The rotary wing aircraft propulsion system of claim 1 further comprising:
a cooling blower for driving air over the heat exchanger, the cooling blower powered by the thermoelectric generator.

10. A rotary wing aircraft comprising:
an airframe;
an engine;
a main gearbox transferring force from the engine to a rotor hub;
a heat exchanger cooling a fluid from the engine;
a thermoelectric generator in thermal communication with the fluid to generate electrical power; and
a tail rotor motor for driving a tail rotor gearbox;
wherein the tail rotor motor receives electrical power from the thermoelectric generator; and
the thermoelectric generator providing electrical power to at least one aircraft component.

11. The rotary wing aircraft of claim 10 wherein:
the heat exchanger is at least one of a coolant heat exchanger cooling engine coolant and an oil heat exchanger cooling oil from the engine.

12. The rotary wing aircraft of claim 11 further comprising:
a fuel source; a fuel supply line providing fuel to the engine;
wherein the fuel supply line is thermally coupled to at least one of the coolant heat exchanger and the oil heat exchanger.

13. The rotary wing aircraft of claim 11 wherein:
the thermoelectric generator is mounted to at least one of the coolant heat exchanger and the oil heat exchanger.

14. The rotary wing aircraft of claim 10 further comprising:
a recuperator in thermal communication with the fluid, the recuperator using heat from the fluid to provide an anti-ice function.

15. The rotary wing aircraft of claim 10 further comprising:
a recuperator in thermal communication with the fluid, the recuperator using heat from the fluid to provide aircraft compartment heating or cooling.

16. The rotary wing aircraft of claim 10 further comprising:
a battery coupled to the thermoelectric generator; and
a power convertor coupled to the battery, the power converter converting DC electrical power from the thermoelectric generator to AC electrical power for aircraft loads.

17. The rotary wing aircraft of claim 10 further comprising:
a cooling blower for driving air over the heat exchanger, the cooling blower powered by the thermoelectric generator.

18. The rotary wing aircraft of claim 10 wherein:
the thermoelectric generator is integrated with the heat exchanger.

* * * * *